United States Patent [19]

Goldkuhle

[11] 4,343,016

[45] Aug. 3, 1982

[54] VIDEO CODING SYSTEM FOR MAIL SHIPMENTS

[75] Inventor: Gerhard Goldkuhle, Constance, Fed. Rep. of Germany

[73] Assignee: Licentia Patent-Verwaltungs-GmbH, Frankfurt am Main, Fed. Rep. of Germany

[21] Appl. No.: 202,729

[22] Filed: Oct. 31, 1980

[30] Foreign Application Priority Data

Nov. 2, 1979 [DE] Fed. Rep. of Germany ....... 2944144

[51] Int. Cl.³ .......................... H04N 7/18; H04N 9/02
[52] U.S. Cl. ........................................... 358/1; 358/10; 358/82; 358/56; 340/701
[58] Field of Search ...................... 358/1, 10, 21 R, 22, 358/40, 56, 64, 81, 82, 93; 273/DIG. 28; 340/701, 703

[56] References Cited

U.S. PATENT DOCUMENTS

| | | | |
|---|---|---|---|
| 3,559,182 | 1/1971 | Floret et al. | 364/900 |
| 3,778,542 | 12/1973 | Hanseman | 358/22 |
| 3,811,113 | 5/1974 | Saito et al. | 364/900 |
| 3,911,418 | 10/1975 | Takeda | 340/73 |
| 4,149,184 | 4/1979 | Giddings | 358/81 |
| 4,183,046 | 1/1980 | Dalke | 358/81 |
| 4,206,457 | 6/1980 | Weisbecker | 340/703 |
| 4,232,311 | 11/1980 | Agneta | 358/81 |

FOREIGN PATENT DOCUMENTS 2049284 4/1971 Fed. Rep. of Germany .
1549934 2/1972 Fed. Rep. of Germany .
2030417 4/1972 Fed. Rep. of Germany .

OTHER PUBLICATIONS

M. Bordes, "A New Postal Technique: Video Coding", l'Echo des Recherches, No. 78, Oct., 1974, pp. 42-49.

Primary Examiner—Michael A. Masinick
Attorney, Agent, or Firm—Spencer & Kaye

[57] ABSTRACT

The present invention relates to a video coding system for mail including a scanner by which pass all letters, and a plurality of monitors for displaying a scanned address. The monitors are video monitors with screens having a controllable color reproduction so as to provide a simple means for realizing changing background hues. The color control signal required for this purpose is generated, uniformly for the entire picture or frame either by means of a simple color detecting device arranged in the area of the scanner or by a respective color control signal generator which is controlled by a random signal generator switched to correspond with the change of frame.

5 Claims, 2 Drawing Figures

VIDEO CODING SYSTEM FOR MAIL SHIPMENTS

BACKGROUND OF THE INVENTION

The present invention relates to a video coding system for mail shipments. More particularly, the present invention relates to a coding system for mail shipments wherein the address field of an item of mail being conveyed along a conveyor path is scanned point-by-point by a scanner to produce a video signal without color information and this video signal is supplied to a video coding station wherein it is displayed on a monitor so that an operator can punch the distribution information associated with the displayed address into a keyboard.

In automatic mail distribution systems, the personnel working at the coding stations (coding personnel) have the task of detecting the addresses on successively presented mail shipments and punching into a keyboard the respectively associated distribution information, e.g., the information corresponding to the postal code or derived from the point of destination. This punched-in distribution information is then fed to a printer, located downstream in the conveying path, which provides each item with an identification imprint bearing the respective distribution information so as to then enable the items to be distributed by time and space autonomous machines.

In the conventional embodiment, the coding stations are included in a conveying system which includes incoming and outgoing conveying troughs, and they each comprise a stacking and separating device and a printer. The required multitude of conveying devices and other mechanical components not only brings about a certain susceptibility to malfunctions, but also leads to stresses on the coding personnel due to dust, noise and heat.

In the video coding system on which the present invention is based, the mechanical processes linked to the stream of conveyed items of mail and the processes derived from the contents of the address fields and associated with the plane of information processing are separated from one another in space and, to a certain respect, also in time. More particularly, in a video coding machine all items are brought in a continuous flow past a scanner which, by scanning the address field of the items in a point-by-point manner, produces a video signal containing the information from the address field. The video coding stations are disposed in another room from the conveyor and are equipped only with a monitor and a keyboard. The video signals associated with the individual letters are stored electronically in a suitable manner and distributed to the individual monitors. The keyed-in distribution information likewise is stored electronically in a suitable manner and associated with the individual letters, which reach the printer of the video coding machine via a mechanical storage path.

Such video coding systems are known, for example, from "ZPF" (Periodical for the Postal and Telegraph Services), 1974, pages 681–688 or from "Postpraxis" (Postal Practice), 1979, pages 197–203.

The introduction of the video coding technique undeniably constitutes a significant improvement in the operating conditions for the coding personnel. The display of the address field of the items of mail to be coded on the screen of a monitor, however, is also connected with certain physiological drawbacks. Inter alia, the monotone (signal color) of the background on the screen (e.g., black print on light green background) may cause the operator to additionally see the complementary colors and result in fatigue phenomena. An obvious measure to alleviate this would be to scan the items of mail and display the information in color using arrangements known from the color television art. However, this is not feasible from an economic point of view due to the large amount of equipment involved.

SUMMARY OF THE INVENTION

It is the object of the present invention to provide a video coding system which, in spite of the use of a scanner producing a video signal without color information, will not have the above-mentioned drawback.

The above object is achieved according to the present invention in that, in a video coding system for mail including a scanning means for generating a video signal without color information by point-by-point scanning of the address field of an item of mail passing by on a conveying path, and a plurality of video coding stations each including a monitor for visually displaying a selected address field so that an operator, on the basis of visual perception, can punch the distribution information associated with the displayed address into a keyboard, each of the monitors is a video receiver with a screen on which color reproduction can be varied by means of a received color control signal, first means are provided for generating a color control signal for each change of picture with the color control signal being associated with the new address field for the duration of the display of same, and second means are provided for supplying the color control signal to the color control input of the monitor.

According to a preferred embodiment of the invention, the color control signal is generated by a color detecting device disposed adjacent the scanner and which detects the actual hue of the piece of mail being scanned, this color control signal is serially combined with the video signal produced by the scanner and transmitted to the monitor where the color control and video signals are separated and fed to the associated inputs of the monitor.

According to another embodiment of the invention, the color control signal is generated by a color control signal generator which is controlled by a random signal generator which is switched on upon each change of picture or frame.

DETAILED DESCRIPTION OF THE PREFERRED EMBODIMENTS

Figure 1:
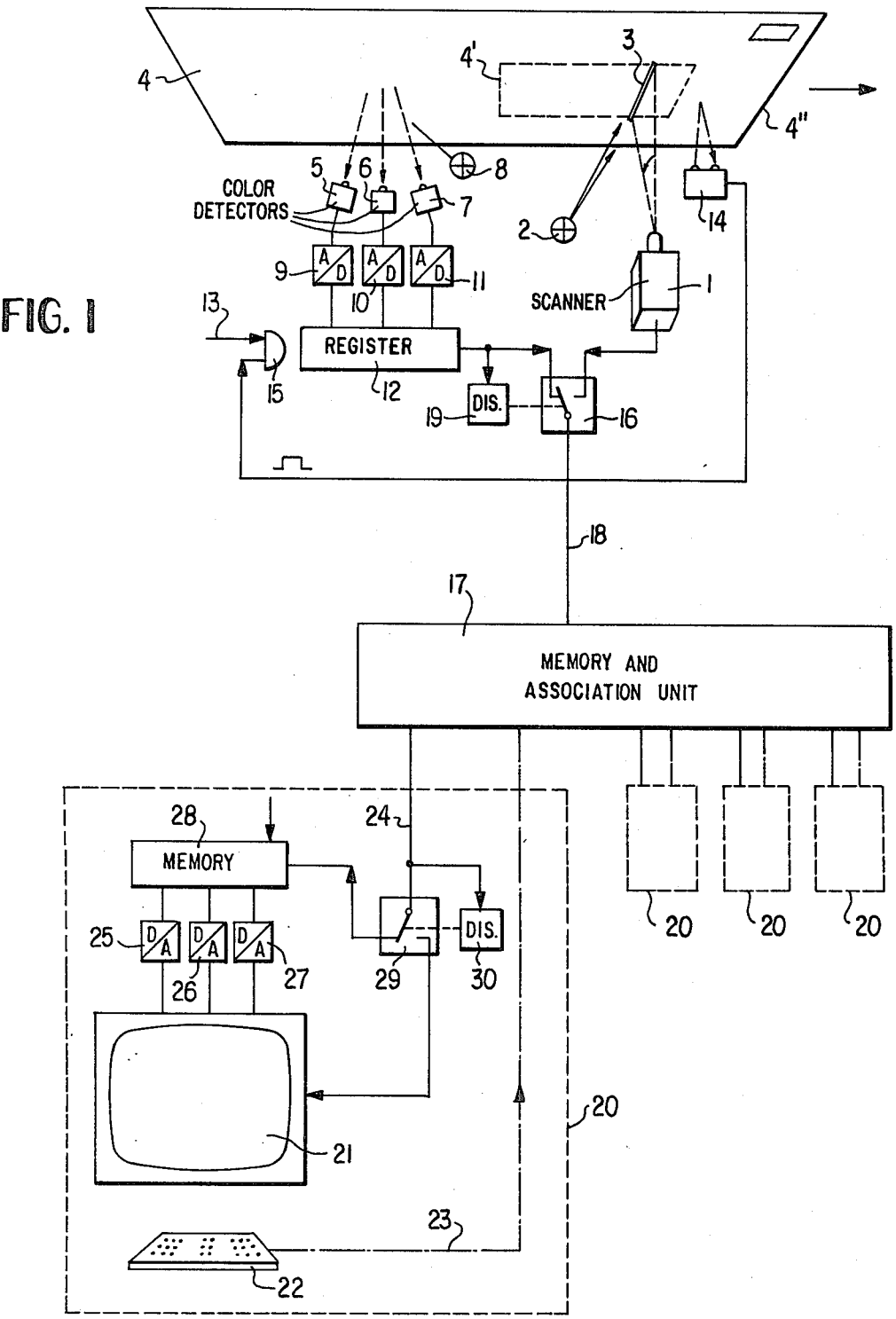
FIG. 1 is a schematic and simplified view of a preferred embodiment of a video coding system according to the invention.

Turning now to FIG. 1, there is shown a video coding system with the part of the video coding machine which includes the scanner being shown at the top.

The scanner 1 is conventional in the art and generally comprises a row of semiconductor photodiodes disposed behind an optical objective lense system and an integrated circuit which effects periodic scanning of the diodes and digitalization of the scanned signal in the sense of a binary quantization. The row of diodes scans the picture elements of a column 3 of the address field 4' of an item of mail 4 passing or being conveyed past the scanner 1 and illuminated by an illuminating device 2, so that the video output signal from the scanner 1, which is without color information, is oriented by columns.

Disposed in the vicinity of the scanner 1 is a color detecting device having a low optical resolution. In the embodiment illustrated in FIG. 1, this color detecting device includes three signal generators or color detection transducers 5, 6 an 7 which are sensitive to respectively different spectral ranges (corresponding to the three basic colors). The zone on the item of mail 4 scanned by the signal generators 5, 6 and 7 is illuminated by a light source 8. Each of the signal generators 5–7 is connected in to a respective analog/digital convertor 9, 10 and 11 whose output signals, in binary coded form, correspond to the intensity values of the remission of the item of mail within the three respective spectral ranges. The output signals of the analog/digital converters 9–11 are entered in parallel into a register 12 which serves as a parallel/series converter. The serial readout of the content of register 12 at a given clock pulse frequency 13, obtained, for example, from the scanner 1, is initiated by a gating pulse, which is generated by a reflected light barrier 14, supplied to an AND gate 15 whose output controls the readout of register 12. The gating pulse is generated by the light barrier 14 upon detection of the passage of the leading edge 4" of the item 4 whose address field 4' will next be scanned by the scanner 1. The light barrier 14 is arranged in such a manner that the readout from register 12 as a result of the generated gating pulse, and thus the point in time of the color detection, occurs before the scanner 1 becomes effective with respect to the address field 4'.

Connected to the output of the scanner 1 and the register 12 is a fade-in stage or electronic switch 16 for selectively connecting a transmission line 18 leading to a memory and association unit 17 with either the output of the register 12 (as shown) or with the output of the scanner 1. In the illustrated embodiment, the switching of stage 16 from the illustrated position to connect the scanner 1 to the line 18 is effected by a discriminator 19 each time after the passage of the last bit of the coded color control signal read out of the register 12. The video signal train associated with a particular address field 4' is thus preceded on the transmission line 18 by the associated color control signal from the register 12.

In the video coding system the transmission line 18 is connected to a memory and association unit 17 which includes, in a known manner not to be explained in detail, a number of intermediate memories, switching devices and image repeat memories. Its task is, inter alia, to store the video signal trains corresponding to the address fields of successive items of mail and to hold them ready for proper forwarding to the individual video coding stations 20 or to their respective monitors 21.

In addition to the video monitor 21, which is equipped with a color picture tube, each video coding station 20 includes a keyboard 22 by means of which an operator can punch in the distribution information associated with the address field being displayed on the monitor 21, and associated electronic circuitry. Upon completion of the input of information to the keyboard 22, a signal line 23 gives a call-up signal to the unit 17. The result of this call up signal is that the coding station 20 receives, via the video line 24, the signals corresponding to the next address field to be displayed on the screen of the monitor 21 and evaluated.

Each color control input of each monitor 21 is connected, via a respective digital/analog converter 25, 26 or 27, with one of the parallel outputs of a memory register 28, with the signals on these parallel outputs corresponding to the three coded color value signals produced by the signal generators 5, 6, and 7. By means of a fade-out stage or electronic switch 29 actuated by the color control signal, the signal on video line 24, and coming from one of the image repeat memories of unit 17, can be fed selectively to the register 28 or to the video input of the monitor 21. The position of the switch 29 is controlled by a discriminator 30, which is connected to the video line 24 and responsive to the signal being transmitted, for detecting the color control signal at the beginning of the received video signal train and placing the switch 29 in the illustrated position to serially read the color control signal into the register 28, and for thereafter causing the switch 29 to move to its other position to permit the actual video signal to reach the video input of the monitor 21.

The above-described configuration indicates that, in the illustrated embodiment, the color control signal is repeated as well for every image repetition, which may actually not be necessary. In any case, immediately upon call-up by the operator via line 23 of the video signal train associated with the next address field, the new color control signal preceding this field on line 24 will be entered via switch 29 into the register 28 so that the color picture tube of the monitor 21 will reproduce the address field without further switching measures, with a background corresponding to the new color hue.

It should be noted that in the illustrated embodiment it has been assumed, for the sake of simplicity, that the monitors 21 are able to directly process the column oriented video signal produced by the scanner 1, i.e., operate with deflection by columns. However, if such is not the case, then it is not difficult for the person skilled in the art to modify the above-described arrangement in such a manner that a column/row conversion takes place in the memory and association unit 17. The only important consideration of the system according to the invention is that transmission and switching devices are provided to feed the color control signal obtained in the color detection device 5–7 to the monitors 21 in the correct time association with the respective address fields to be displayed.

Figure 2:
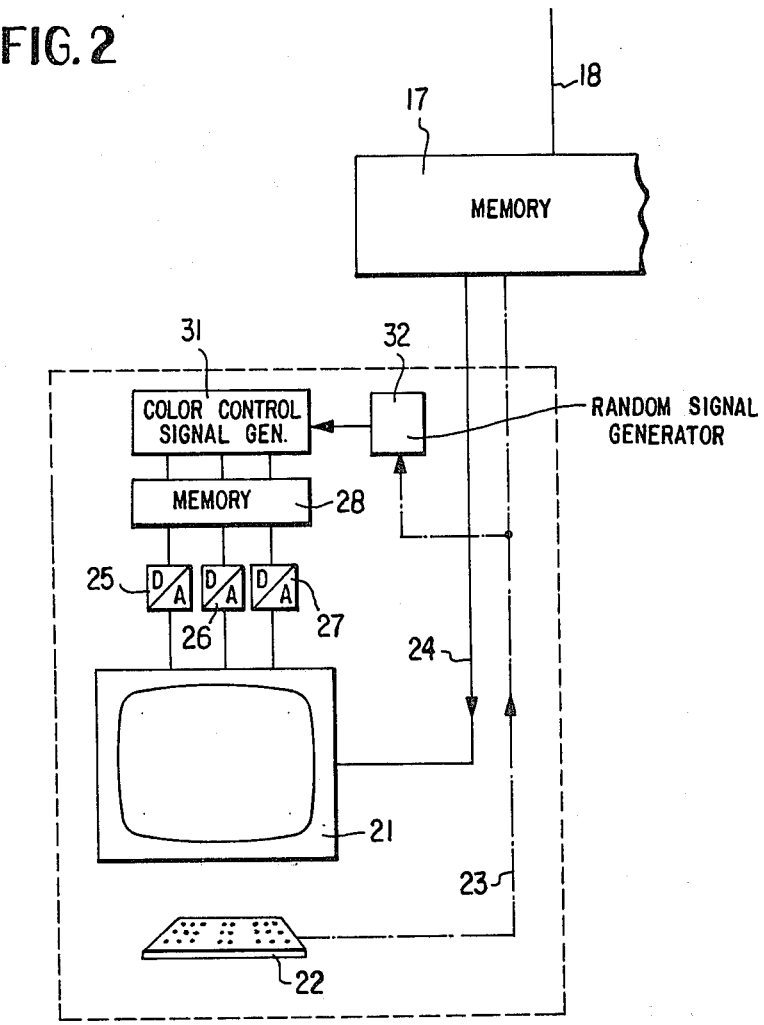
FIG. 2 is a schematic and simplied view of a video coding station for use in a second embodiment of a video coding system according to the invention.

In the simplified embodiment of the invention shown in FIG. 2 only the video coding stations 20 or their monitors 21, respectively, but not the scanner, are provided with additional circuit members for providing the color control signal.

According to this embodiment of the invention, the generated color control signal to determine the color hue of the picture tube of the monitor 21 is not based on the actual color of the respective item of mail. Rather, a special color control signal generator 31 is provided whose parallel output signal takes the place of the output signals from signal generators 5, 6 and 7 of FIG. 1. The generator 31 is here controlled with respect to the color hue to be generated by the output signal of a random generator 32 which is switched on at every change of picture by the demand on call-up signal given by the keyboard 22 to the signal line 23. With proper modification, both embodiments of the invention can also be used when video coding stations are employed which are equipped, in order to simultaneously display two successive address fields, with two monitors which may be arranged, for example, on top of the other or with stations which display two address fields on single monitor.

It is to be understood that the above description of the present invention is susceptible to various modifications, changes and adaptations, and the same are intended to be comprehended within the meaning and range of equivalents of the appended claims.

What is claimed is:

1. In a video coding system for mail including a scanning means for generating a video signal without color information by point-by-point scanning of the address field of an item of mail passing by on a conveying path, and a plurality of video coding stations each including a monitor responsive to a received said video signal for visually displaying a selected address field so that an operator, on the basis of visual perception, can punch the distribution information associated with the displayed address into a keyboard; the improvement wherein: each of said monitors is a video receiver with a screen on which color reproduction can be varied by means of a received color control signal; first means are provided for generating a color control signal for each change of picture with said color control signal being associated with the new address field for the duration of the display of same, said first means for generating a color control signal includes a color detection means of low optical resolution disposed in the region of said scanning means for providing an output signal which constitutes said color control signal and which contains the color information corresponding to the color of the passing item of mail; and second means are provided for supplying said color control signal to the color control input of said monitor, said second means includes transmission and switching circuit means for feeding said color control signal to said monitors in the correct time association with the respective address fields to be displayed.

2. A video coding system as defined in claim 1 wherein said second means includes a respective memory device for each said monitor, each said memory device having its output connected with the color control input of the associated monitor and its input connected to receive a color control signal associated with the address field to be displayed on said monitor.

3. A video coding system as defined in claim 1, wherein said transmission and switching circuit means includes: means disposed adjacent said scanning means for serially adding the color control signal produced by said color detection means to the video signal train associated with the address field being produced by said scanning means; and means included in the signal path of the video signal adjacent each monitor for separating said color control signal from said video signal.

4. A video coding system as defined in claim 1 wherein said color detection means includes three signal generators which are sensitive to light in different spectral ranges, and circuit means for forming a color control signal adapted to the transmission channel from the quantized output signals of said signal generators.

5. A video coding system as defined in claim 4 wherein: said circuit means for forming a color control signal includes a respective analog to digital converter connected to the output of each of said three signal generators, and a register having its parallel inputs connected to the respective outputs of said digital to analog converter; said transmission and switching circuit means includes means responsive to the presence of a new item of mail opposite said scanning means, for serially reading out the content of said register and for adding same to the video signal train associated with the address field being produced by said scanning means, circuit means, disposed adjacent each monitor and responsive to the presence of a video signal train, for separating said color control signal from said video signal and for feeding said color control signal to said memory and said video signal to the video input of said monitor; and said second means further includes a respective digital to analog converter connected between each output of said memory and the associated color control input of said monitor.

* * * * *